United States Patent
Hadzidedic et al.

(10) Patent No.: US 9,261,282 B2
(45) Date of Patent: Feb. 16, 2016

(54) HEATING SYSTEM CONTROLLER, A HEATING SYSTEM AND A METHOD OF OPERATING A HEATING SYSTEM

(75) Inventors: Darko Hadzidedic, Plano, TX (US); Pete Den Boer, The Colony, TX (US); Wojciech Grohman, Little Elm, TX (US)

(73) Assignee: Lennox Industries Inc., Richardson, TX (US)

( * ) Notice: Subject to any disclaimer, the term of this patent is extended or adjusted under 35 U.S.C. 154(b) by 1800 days.

(21) Appl. No.: 12/557,345

(22) Filed: Sep. 10, 2009

(65) Prior Publication Data
US 2011/0057046 A1    Mar. 10, 2011

(51) Int. Cl.
| | | |
|---|---|---|
| F24D 11/02 | (2006.01) | |
| F24D 5/12 | (2006.01) | |
| F24D 5/02 | (2006.01) | |
| F24D 19/10 | (2006.01) | |
| F24D 12/02 | (2006.01) | |

(52) U.S. Cl.
CPC .. F24D 5/02 (2013.01); F24D 5/12 (2013.01); F24D 19/1087 (2013.01)

(58) Field of Classification Search
CPC .............. F24D 5/12; F24D 5/02; F24D 5/04; F24D 15/04; F24D 12/02; F24D 19/1087; F25B 30/02; F25B 13/00; G05D 23/00
USPC ....... 237/2 A, 2 B, 2 R, 50, 81; 236/1 C, 1 E, 236/91 D; 219/507–510, 482, 490–494, 219/539; 62/160, 228.5, 229

IPC .................. F24D 11/02,5/12, 5/02, 5/04, 12/02, F24D 13/04, 15/04, 19/10
See application file for complete search history.

(56) References Cited

U.S. PATENT DOCUMENTS

| | | | | |
|---|---|---|---|---|
| 3,358,739 A | * | 12/1967 | Pinkerton et al. .................. | 159/8 |
| 4,215,408 A | * | 7/1980 | Games et al. .................. | 700/278 |
| 4,265,298 A | * | 5/1981 | Sumner et al. ................ | 237/2 A |
| 4,289,272 A | * | 9/1981 | Murase et al. ............... | 236/91 D |
| 4,293,092 A | * | 10/1981 | Hatz et al. ..................... | 237/12.1 |
| 4,450,897 A | * | 5/1984 | Iijima et al. ................... | 165/202 |
| 4,474,227 A | * | 10/1984 | Reedy ............................ | 237/2 A |
| 4,543,468 A | * | 9/1985 | Shaffer et al. ................. | 392/308 |
| 4,627,483 A | * | 12/1986 | Harshbarger et al. ......... | 237/2 A |
| 4,627,484 A | * | 12/1986 | Harshbarger et al. ......... | 237/2 A |
| 5,367,601 A | * | 11/1994 | Hannabery ................... | 392/307 |
| 5,400,852 A | * | 3/1995 | Nakae et al. .................. | 165/205 |
| 5,405,079 A | * | 4/1995 | Neeley ................ | F24D 19/1039 165/241 |
| 5,417,368 A | * | 5/1995 | Jeffery et al. .................. | 237/2 B |
| 5,488,218 A | * | 1/1996 | Olsen et al. ................... | 219/492 |
| 5,538,072 A | * | 7/1996 | Burkhart et al. .............. | 165/232 |
| 5,967,411 A | * | 10/1999 | Perry et al. ..................... | 237/2 B |
| 5,984,198 A | * | 11/1999 | Bennett et al. ................ | 237/2 B |

(Continued)

*Primary Examiner* — Gregory Huson
*Assistant Examiner* — Daniel E Namay
(74) *Attorney, Agent, or Firm* — Baker Botts L.L.P.

(57) ABSTRACT

A heating system, a method of operating a heating system and a controller for a heating system are disclosed herein. In one embodiment, the controller includes: (1) a system interface configured to receive thermostat calls from a thermostat, the thermostat calls including a heat pump thermostat call and an electrical heating elements thermostat call and (2) a processor coupled to the system interface and configured to select a starting heat load for the heating system based on the thermostat calls and a selected target discharge air temperature for the heating system.

20 Claims, 3 Drawing Sheets

(56) References Cited

U.S. PATENT DOCUMENTS

| | | | | |
|---|---|---|---|---|
| 6,073,690 | A * | 6/2000 | Raley | 165/241 |
| 6,149,066 | A * | 11/2000 | Perry et al. | 237/2 B |
| 6,175,782 | B1 * | 1/2001 | Obradovich et al. | 701/1 |
| 6,212,894 | B1 * | 4/2001 | Brown | F24D 19/1054 236/20 R |
| 6,347,527 | B1 * | 2/2002 | Bailey | F24F 3/001 165/45 |
| 6,409,090 | B1 * | 6/2002 | Gilvar | G05D 23/1923 122/448.1 |
| 6,729,390 | B1 * | 5/2004 | Toth | F24D 12/02 165/240 |
| 6,778,945 | B2 * | 8/2004 | Chassin et al. | 702/188 |
| 6,859,687 | B2 * | 2/2005 | Obradovich et al. | 701/1 |
| 6,874,693 | B2 * | 4/2005 | Readio et al. | 237/2 B |
| 7,083,109 | B2 * | 8/2006 | Pouchak | 236/1 E |
| 7,172,018 | B2 * | 2/2007 | Katou et al. | 165/204 |
| 7,212,887 | B2 | 5/2007 | Shah et al | |
| 7,222,800 | B2 * | 5/2007 | Wruck | 236/51 |
| 7,284,710 | B2 * | 10/2007 | Rixen | F23N 3/08 237/12.3 B |
| 7,296,426 | B2 * | 11/2007 | Butler et al. | 62/181 |
| 7,402,780 | B2 * | 7/2008 | Mueller et al. | 219/494 |
| 7,565,813 | B2 * | 7/2009 | Pouchak | 62/126 |
| 7,600,694 | B2 * | 10/2009 | Helt et al. | 236/1 B |
| 7,650,927 | B2 * | 1/2010 | Burns | 165/42 |
| 7,802,618 | B2 * | 9/2010 | Simon | F24F 11/0012 165/254 |
| 7,848,900 | B2 * | 12/2010 | Steinberg et al. | 702/130 |
| 7,857,233 | B2 * | 12/2010 | Trantham | F24D 19/1015 165/209 |
| 8,209,059 | B2 * | 6/2012 | Stockton | 700/278 |
| 8,321,058 | B2 * | 11/2012 | Zhou et al. | 700/278 |
| 8,356,760 | B2 * | 1/2013 | Riley, Jr. | 236/44 C |
| 8,413,454 | B2 * | 4/2013 | Butler et al. | 62/180 |
| 8,636,226 | B2 * | 1/2014 | Paulus et al. | 237/12.1 |
| 2002/0134528 | A1 * | 9/2002 | Sterner | 165/48.1 |
| 2003/0019230 | A1 * | 1/2003 | Gether et al. | 62/238.7 |
| 2003/0102121 | A1 * | 6/2003 | Lee | 165/240 |
| 2003/0110001 | A1 * | 6/2003 | Chassin et al. | 702/104 |
| 2003/0116637 | A1 * | 6/2003 | Ellingham | 237/2 B |
| 2005/0040247 | A1 * | 2/2005 | Pouchak | 236/44 C |
| 2005/0040248 | A1 * | 2/2005 | Wacker et al. | 236/51 |
| 2005/0040249 | A1 * | 2/2005 | Wacker et al. | 236/51 |
| 2005/0040250 | A1 * | 2/2005 | Wruck | 236/51 |
| 2005/0087616 | A1 * | 4/2005 | Attridge | 236/91 D |
| 2006/0186214 | A1 * | 8/2006 | Simon et al. | 236/1 C |
| 2007/0040040 | A1 * | 2/2007 | Mueller | 236/1 C |
| 2007/0084938 | A1 * | 4/2007 | Liu | 236/91 D |
| 2007/0114291 | A1 * | 5/2007 | Pouchak | 236/44 C |
| 2007/0138308 | A1 * | 6/2007 | Schultz et al. | 236/1 C |
| 2008/0054082 | A1 * | 3/2008 | Evans et al. | 236/91 D |
| 2008/0191045 | A1 * | 8/2008 | Harter | 236/91 D |
| 2010/0038441 | A1 * | 2/2010 | Pedersen | F24D 11/0221 237/2 B |
| 2010/0090017 | A1 * | 4/2010 | Naghshineh | 237/2 B |
| 2011/0057046 | A1 * | 3/2011 | Hadzidedic et al. | 237/50 |

\* cited by examiner

HEATING SYSTEM CONTROLLER, A HEATING SYSTEM AND A METHOD OF OPERATING A HEATING SYSTEM

TECHNICAL FIELD

This application is directed, in general, to a climate control system for an enclosure and, more specifically, to the heating components of the climate control system.

BACKGROUND

The heating system of a climate control system may include a plurality of electrically resistive heating elements and a heat pump. The electrically resistive heating elements produce heat in response to the passage of electric current therethrough. An air blower is used to circulate air between the heating system and an enclosure. Typically, a demand for heat signal from an indoor thermostat or the like activates the heating elements and the air blower to move across the heating elements and carry the heat by convection to the enclosure to satisfy the demand for heat.

Since operation of the heat pump is usually more energy efficient, the heating elements are typically used as a backup. As such, only the heat pump may be used to satisfy an initial demand for heat (i.e., the first stage heat demand). If the indoor temperature falls below a predetermined threshold temperature, which is less than the temperature corresponding to the first stage demand, a second stage demand for heat is indicated. In response to the second stage demand, the electric heating elements may be activated.

The electric heating elements may also be used as the primary source of heat for an enclosure when the heat pump is not able to function efficiently. For example, when the outside air temperature drops below a minimum temperature (e.g., 10 degrees Fahrenheit) the heat pump may not be operable due to a low ambient temperature condition. Regardless of whether the electrical heating elements or the heat pump are initially activated to respond to a heat demand from a thermostat, time is required for the heating elements and the coil of the heat pump to heat-up after activation. As such, at startup, cold bursts of air may be blown into the enclosure that is being heated.

SUMMARY

One aspect of this disclosure provides a controller for a heating system having a heat pump, electrical heating elements, a blower and a thermostat. In one embodiment, the controller includes: (1) a system interface configured to receive thermostat calls from the thermostat, the thermostat calls including a heat pump thermostat call and an electrical heating elements thermostat call and (2) a processor coupled to the system interface and configured to select a starting heat load for the heating system based on the thermostat calls and a selected target discharge air temperature for the heating system.

In another aspect, a method of operating a heating system having a heat pump, electrical heating elements and a thermostat is disclosed. In one embodiment, the method includes: (1) monitoring the thermostat for calls associated with the heat pump and the electrical heating elements, (2) determining a discharge air target temperature of the heating system and (3) selecting a starting heat load based on the thermostat calls and the discharge air target temperature.

In yet another aspect, a heating system for an enclosure is disclosed. In one embodiment, the heating system includes: (1) a heat pump, (2) electrical heating elements, (3) a blower, (4) a thermostat and (5) a controller coupled to the heat pump, the electrical heating elements, the blower and the thermostat, the controller having: (5A) a system interface configured to receive thermostat calls from the thermostat, the thermostat calls including a heat pump thermostat call and an electrical heating elements thermostat call and (5B) a processor coupled to the system interface and configured to select a starting heat load for the heating system based on the thermostat calls and a selected target discharge air temperature for the heating system.

BRIEF DESCRIPTION

Reference is now made to the following descriptions taken in conjunction with the accompanying drawings, in which.

DETAILED DESCRIPTION

The disclosure provides an air handler controller that determines an optimal starting load for a heating system having a heat pump and electrical heating elements based on the configuration and settings of the heating system. The configuration and settings of the heating system may include the number of electrical heating elements installed, the thermostat calls and the target discharged air temperature. The air handler controller may automatically detect the number of electrical heating elements that are installed. In one embodiment disclosed herein, the air handler controller uses sensing circuitry to automatically detect when the electrical heating elements are field installed. In other embodiments, the number of electrical heating may be obtained by other devices or methods such as through a user interface, jumpers or DIP switch selection. By using the optimal starting load for initiating the heat pump and/or the electrical heating elements, the heating system can improve the time needed to obtain a target temperature for the discharged air. As such, the period of discharged cool air due to inadequate heating for given airflow is reduced.

Additionally, the air handler controller can delay, for a predetermined amount of time, activation of the air blower of the heating system when there is a thermostat call for heat from the heat pump. Thus, the air handler controller can leave the heat pump coil activated and then after the predetermined amount of time, activate the air blower. The heating system, therefore, can allow heat to build up in the heat pump coils to prevent cold air burst on a normal start-up. The predetermined amount of time may be, for example, thirty seconds with the air blower then reaching full speed in sixty seconds. The predetermined amount of time can be programmed into the air handler controller at installation.

Figure 1:
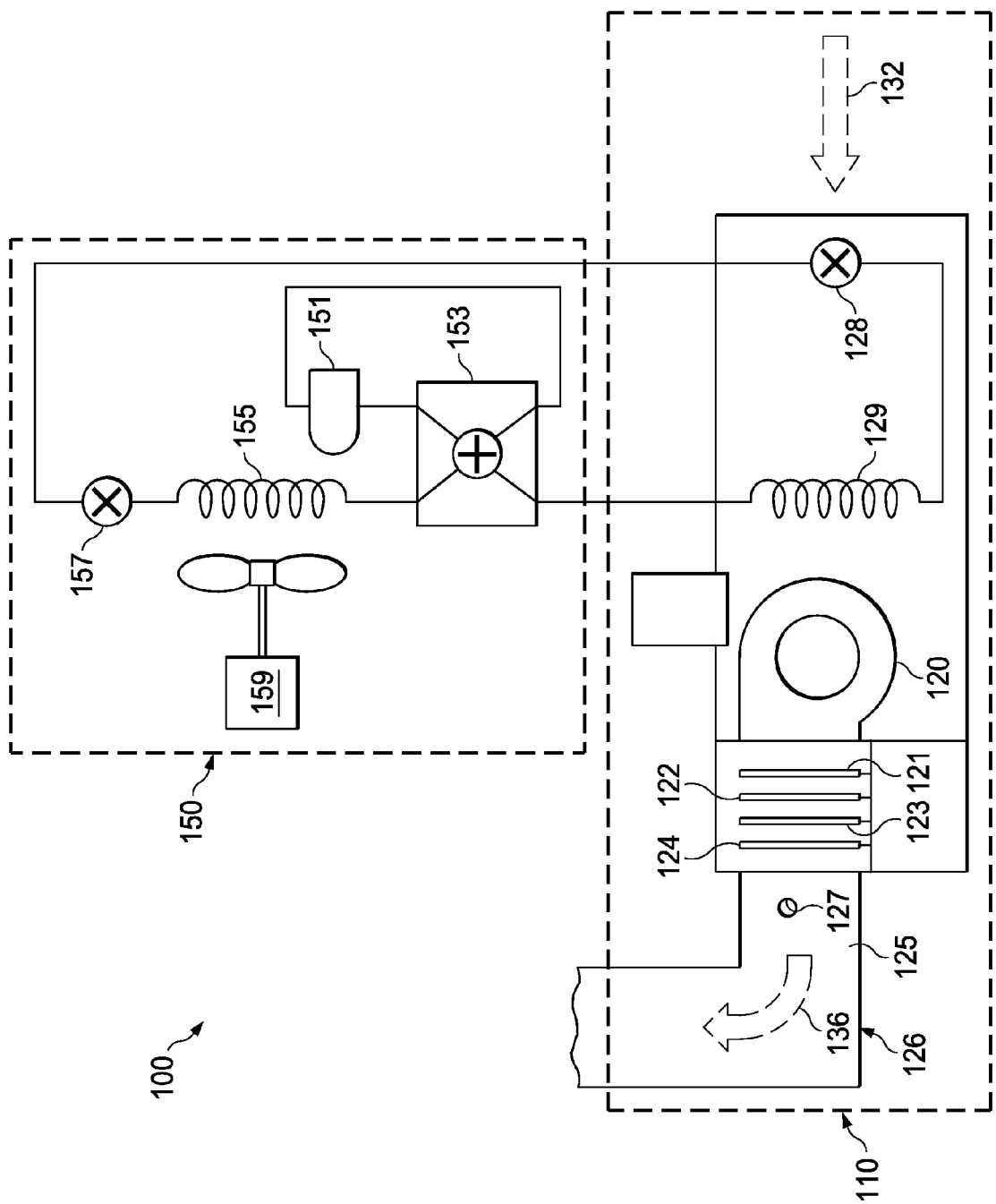
FIG. 1 is a schematic diagram of a conventional heating system.

FIG. 1 is a schematic diagram of a conventional heating system 100 wherein a controller as disclosed herein may be used. The heating system 100 includes an indoor portion 110 having an air blower 120, and a plurality of electrical heating elements 121, 122, 123 and 124, collectively referred to herein as the electrical heating elements 121-124. One skilled in the art will recognize that the number of electrical heating elements is variable with four being an example. Downstream from the electrical heating elements 121-124 is a discharge plenum 125. A thermostat (not shown) is also typically employed with the heating system 100 and used as a user interface for the heating system 100.

Air blower 120 is configured to circulate air through an enclosure (not shown) by suctioning air from the enclosure, as indicated by arrow 132 and discharging air to the enclosure, as indicated by arrow 136 through the plenum 125 and an air duct 126. The plenum 125 is in fluid communication with the air duct 126 to supply discharged air to the enclosure. A temperature sensor 127 is located in the plenum 125 for sensing the temperature of the discharged air. Alternatively, temperature sensor 127 may be located at another appropriate location within the indoor portion 110 for sensing discharged air temperature. More than one temperature sensor may also be used. The temperature sensor 127 may be an air sensor of the 1211J98 type, manufactured and sold by Lennox International Inc., of Richardson, Tex.

Indoor portion 110 also includes an indoor expansion device 128 and an indoor coil 129 of a heat pump. The remaining illustrated portion of the heat pump is located in the outdoor portion 150 of the heating system 100. The outdoor components of the heat pump include a compressor 151, a reversing valve 153 (for cooling and defrost), an outdoor coil 155, an outdoor expansion device 157 and an outdoor fan 159.

Figure 2:
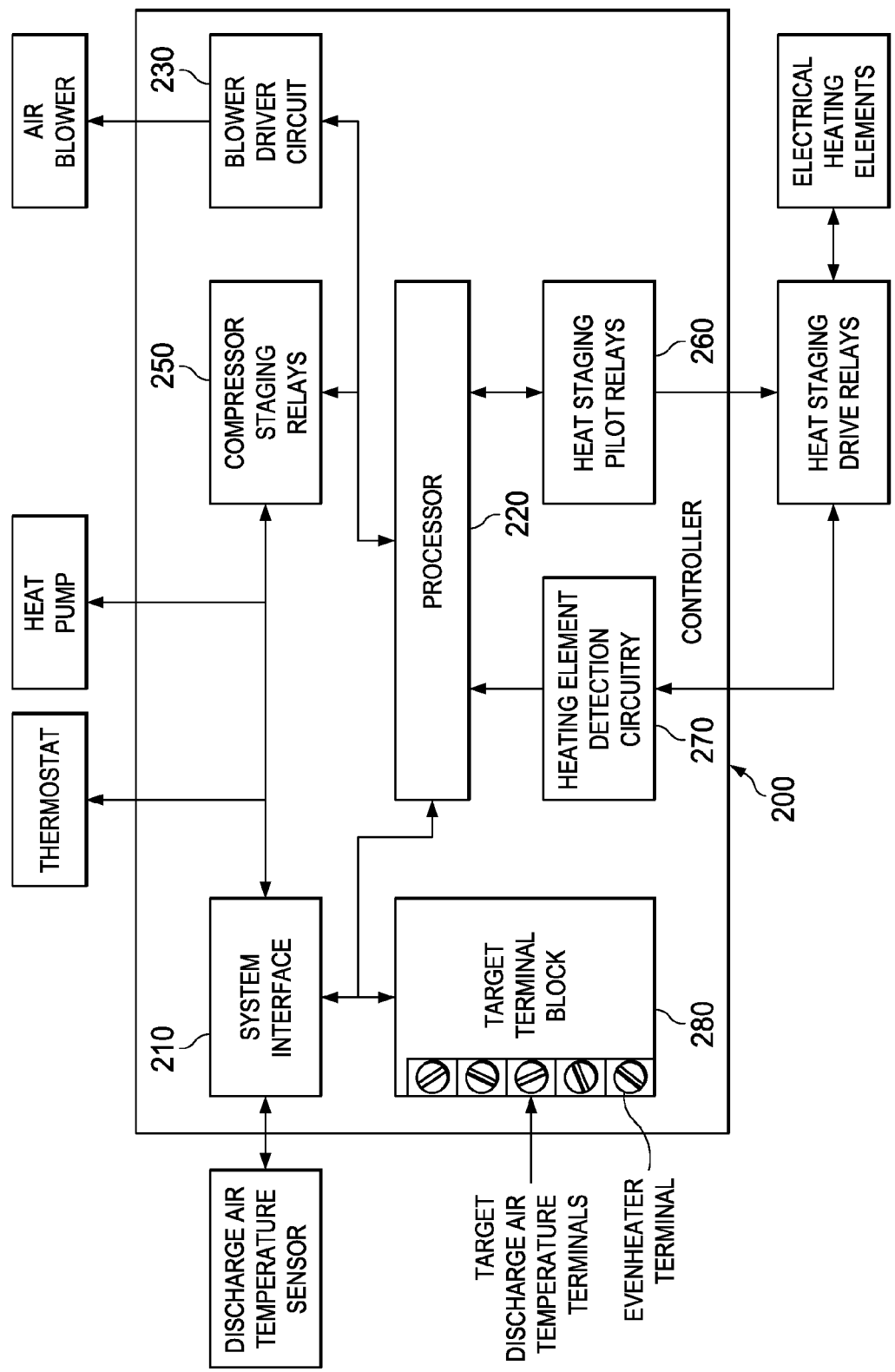
FIG. 2 is a block diagram of an embodiment of an air handler controller constructed according to the principles of the present disclosure.

FIG. 2 is a block diagram of an embodiment of a controller 200 constructed according to the principles of the present disclosure. The controller 200 is configured to control operations of the components of a heating system including a heat pump and electrical heating elements. The heating system, for example, may include components as illustrated and discussed with respect to the heating system 100 of FIG. 1. The controller 200 includes a system interface 210, a processor 220, a blower driver circuit 230, compressor staging relays 250 and heat staging pilot relays 260. The controller 200 also includes heating element detection circuitry 270 and a target temperature terminal block 280.

The system interface 210 is configured to provide circuitry interfaces between the controller 200, including the processor 220, and other components of the heating system. The circuitry interfaces may be a terminal block or blocks with designated terminals for interfacing with particular components of the heating system. The system interface 210 may include terminals that provide an interface between a temperature sensor, such as the temperature sensor 127 of FIG. 1, and the processor 220. Additionally, the system interface 210 may include terminals that provide an interface between a thermostat of the heating system, such as an indoor thermostat, and the processor 220. The system interface 210 may also include loading circuitry that imposes a defined load on the thermostat anticipator in a conventional manner.

The system interface 210 is configured to receive thermostat calls from the thermostat. The thermostat calls include heat pump thermostat calls and electrical heating elements thermostat calls. The thermostat calls indicate various demands from the thermostat. One skilled in the art will understand thermostat calls and the various demands they represent. The thermostat calls associated with the heat pump and the electrical heating elements include a first stage heat pump demand (Y1), a second stage heat pump demand (Y2) and electrical heat demands (W). The electrical heat demands may include multiple demands such as a first stage electrical heat demand (W1) and a second stage electrical heat demand (W2).

The processor 220 is coupled to the system interface 210 and is configured to sense the inputs coupled thereto, such as the thermostat calls and the input from the temperature sensor. The processor 220 may be configured to operate the heating system based on an algorithm embodied as a series of operating instructions stored on a computer readable storage medium that directs the operation of the processor 220 when executed thereby. The processor 220 may be a dedicated computing-device having the necessary circuitry to perform the functions described herein and having the necessary hardware to receive inputs and provide outputs. In one embodiment, the processor 220 may be a microcontroller. For example, the processor 220 may be an 8051 type of microprocessor manufactured and sold by Intel Corporation of Santa Clara, Calif.

The processor 220 is configured to control the air blower via the blower driver circuit 230. Additionally, the processor 220 is configured to control the compressor staging relays 250 and the heat staging pilot relays 260. A relay driver circuit may be employed to control the compressor staging relays 250 and heat staging pilot relays 260. The heat staging pilot relays 260 are used to selectively activate and deactivate the electrical heating elements based on received electrical heat demands. A power relay may be used to drive the electrical heating elements, such as, the heat staging drive relays illustrated in FIG. 2.

The compressor staging relays 250 and the heat pump are connected to the system interface 210. A first stage of the heat pump can be driven directly from thermostat calls via the system interface 210. The processor 220 can activate a second stage of the heat pump (i.e., upstage the heat pump to the second stage) if required. The upstage may be based on, for example, a starting load algorithm or table such as provided in Table 1. The processor 220 may employ the compressor staging relays 250 for upstaging. The compressor may be a two-speed heat pump compressor wherein a first stage heat pump demand Y1 results in activation of the first speed and a second stage heat pump demand Y2 results in activation of the second speed. The controller 200 may include other components typically included in an air handler controller for a climate control system such as a power supply module for converting incoming power (e.g., 125 volt AC power) to DC power at selected voltages (e.g., 5 and 15 volts) for operation of the various components of the controller 200. One skilled in the art will understand the operation of the blower driver circuit 230, the compressor staging relays 250 and the heat staging pilot relays 260.

The heating element detection circuitry 270 is configured to automatically detect the number of electrical heating elements connected to the heating system. The electrical heating elements are typically field installed and the heating element detection circuitry 270 can automatically detect the number installed. In one embodiment, the heating element detection circuitry 270 is current sensing circuitry that detects when an electrical heating element is installed.

The processor 220 is coupled to the heating element detection circuitry 270 and is configured to sense the number of connected electrical heating elements therefrom. In one embodiment, the return coil current of the heat staging drive relays is sensed. Presence of current when the heat staging pilot relays 260 is activated indicates the installation of an electrical heating element. By employing the heating element detection circuitry 270, the processor 220 can confirm the electrical heat for the heating system is properly installed, can optimize the electrical heating control algorithm and detect errors, such as, determining that no electrical heat element is activated (i.e., return coil current not sensed for element that was previously detected).

The processor 220 is also coupled to the target temperature terminal block 280 that is used to set a target discharge air temperature for the heating system. In one embodiment, the target temperature terminal block 280 may include terminals with each terminal representing a designated target discharge air temperature. To select one of the designated target temperatures, a jumper can be set on the corresponding terminal. The jumper position can be sensed by the processor 220. In one embodiment, the target discharge air temperatures are 85°, 100°, 115° and 130°. In one embodiment, the target temperature terminal block 280 may also include an evenheater terminal. The evenheater terminal may be used to indicate if the heating system will operate in a mode to reduce cold air bursts. When a jumper is applied to the evenheater terminal, then the heating system may operate to reduce cold air bursts as described herein. If not jumpered, the heating system may not operate to reduce cold air bursts. An evenheater terminal and terminals for designated target discharge air temperatures are illustrated in FIG. 2. One skilled in the art will understand that the number of designated target discharge air temperatures and corresponding terminals may vary. Additionally, the number of terminals may not be equivalent to the number of target temperatures that are available. In some embodiments, jumpers on multiple terminals for the designated target discharge air temperatures may be used to indicate a specific target temperature. As such, fewer terminals may be used with more target temperatures.

In addition to the other functions, the processor 220 is also configured to select a starting heat load for the heating system based on the heat pump and the electrical heating elements thermostat calls and a selected target discharge air temperature. As noted above, the processor 220 can determine the selected target discharge air temperature based on a selected input of the target temperature terminal block 280. For example, the target terminal block of the system interface 210 may be set for a target starting discharge air temperature of 85°. As such, the processor 220 can sense the selected target discharge air temperature of 85° from the target terminal block. The processor 220 may also consider the number of the electrical heating elements installed in the heating system when selecting a starting heat load. The starting heat load is the heat pump stage and the electrical heat load (number of electrical heat elements) activated by the controller 200 upon initiation of a heat call by the thermostat. In one embodiment, the processor 220 may select the starting heat load according to Table 1 below.

The processor 220 is also further configured to delay activation of the air blower for a predetermined amount of time when receiving a heat pump thermostat call. In some embodiments, the predetermined amount of time may be thirty seconds. This allows the indoor coils to build-up heat before the air blower is started. This reduces the occurrence of cold air bursts when the heat pump is started.

ing heat loads, the actual discharge air temperature may more quickly reach the target discharge air temperature. In Table 1, HP $1^{st}$ STAGE represents first stage of the heat pump and HP $2^{nd}$ STAGE represents the second stage of the heat pump. H1 and H2 represent electrical heating elements 1 and 2, respectively. NHSD represents the number of electrical heating elements that are installed in the heating system.

The first column of the table includes thermostat calls and the remaining columns include the starting loads for specific target discharge air temperatures. The thermostat calls include heat pump demands Y including a first stage heat pump demand Y1 and a second stage heat pump demand Y2. Additionally, electrical heat demands W are included, such as, a first stage electrical heat demand W1 and a second stage electrical heat demand W2. The processor 220 selects an optimal heating load for the heating system based on the selected target air discharge temperature and the various thermostat calls that are sensed. For example, consider a selected target discharge air temperature of 85 degrees Fahrenheit. If a thermostat call of Y1 was sensed, the first stage of the heat pump (i.e., HP $1^{st}$ STAGE) would be activated and the processor 220 would not perform any upstaging of the heat pump or electrical heat. Additionally, if the targeted discharge air temperature of 115 degrees Fahrenheit was selected and only an electrical heat demand thermostat call W is received, then the heating element or heating elements for H1 are activated and for H2 if there are more than 2 electrical heating elements in the system.

Figure 3:
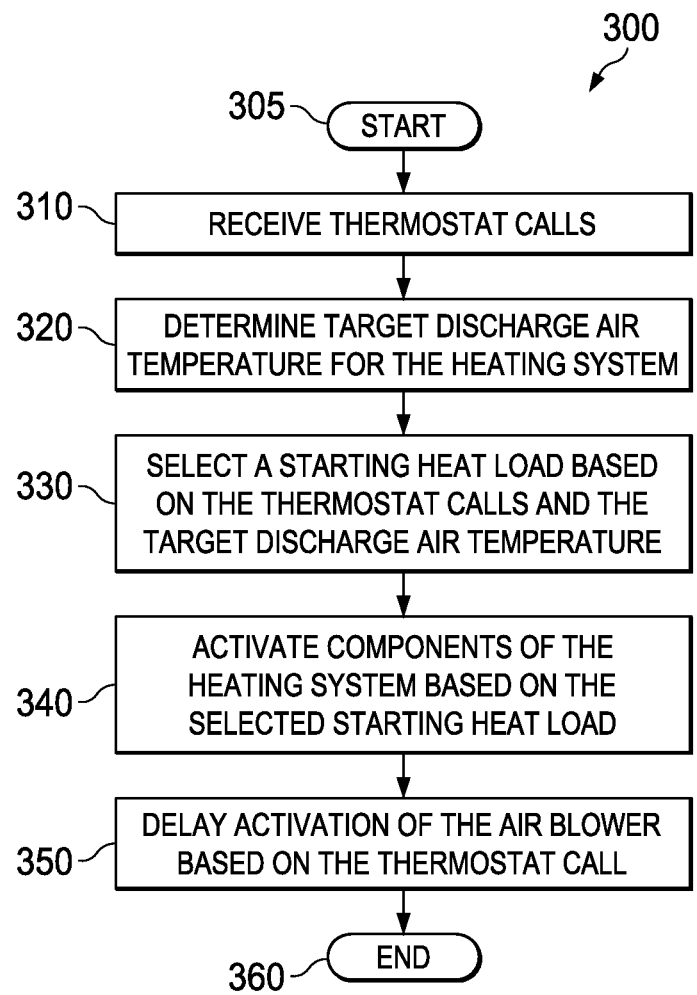
FIG. 3 is a flow chart of an embodiment of a method of operating a heating system carried out according to the principles of the present disclosure.

FIG. 3 is a flow chart of an embodiment of a method 300 of operating a heating system carried out according to the principles of the present disclosure. The heating system at least includes a heat pump, electrical heating elements and a thermostat. Additionally, the heating system includes a controller such as the controller 200 of FIG. 2. A processor of the controller, such as the processor 220, may be used to carry out at least a portion of the method 300. The method 300 begins in a step 305.

In a step 310, thermostat calls associated with the heat pump and the electrical heating elements are monitored. The processor may monitor the thermostat calls via a system interface. The thermostat calls may include heat pump demands and electrical heat demands, such as, a first stage heat pump demand, a second stage heat pump demand and a first stage electrical heat demand.

A target discharge air temperature of the heating system is determined in a step 320. The target discharge air temperature may be determined based on a predetermined setting. For example, the processor may determine the target discharge air temperature from a target terminal block of the controller.

Thereafter, a starting heat load based on the thermostat calls and the discharge air target temperature is selected in a

TABLE 1

Starting Heat Loads

| THERMOSTAT CALLS | STARTING LOAD FOR EH @ 85 F. | STARTING LOAD FOR EH @ 100 F. | STARTING LOAD FOR EH @ 115 F. |
|---|---|---|---|
| Y1 | HP $1^{ST}$ STAGE | HP $2^{ND}$ STAGE | HP $2^{ND}$ STAGE + H1 |
| Y2 | HP $2^{ND}$ STAGE | HP $2^{ND}$ STAGE + H1 | HP $2^{ND}$ STAGE + H1 |
| Y + W | HP $2^{ND}$ STAGE + H1 | HP $2^{ND}$ STAGE + H1 (+H2 IF NHSD >2) | HP $2^{ND}$ STAGE + H1 (+H2 IF NHSD >2) |
| W ONLY | H1 | H1 (+H2 IF NHSD >2) | H1 (+H2 IF NHSD >2) |

Table 1 illustrates various starting heat loads for target discharge air temperatures. By employing the optimal startstep 330. The selection of the starting heat load may also be based on a number of the electrical heating elements installed in the heating system. The number of electrical heating elements connected to the heating system may be automatically detected from current sensing circuitry.

Components of the heating system are then activated based on the selected starting heat load in a step 340. For example, electrical heating element(s) and/or the heat pump may be activated according to the starting heat load that was selected. In some embodiments, a processor of an air handler controller may activate the appropriate heating components per a table, such as Table 1 discussed above.

In a step 350, activation of an air blower of the heating system is delayed for a predetermined amount of time based on a thermostat call. In one embodiment, the air blower is delayed if the thermostat call was only for activating the heat pump. By delaying activation of the air blower, cold air burst can be reduced. The method 300 then ends in a step 360

Those skilled in the art to which this application relates will appreciate that other and further additions, deletions, substitutions and modifications may be made to the described embodiments.

What is claimed is:

1. A controller for a heating system having a heat pump, electrical heating elements, a blower and a thermostat, said controller comprising:
    a system interface configured to receive thermostat calls from said thermostat, said thermostat calls including a heat pump thermostat call and an electrical heating elements thermostat call; and
    a processor coupled to said system interface and configured to select a starting heat load for said heating system, by selectively energizing at least one of said heat pump, electrical heating elements and blowers, based on said thermostat calls and a selected target discharge air temperature for said heating system;
    wherein said target discharge air temperature is selected from a predefined list of target discharge air temperatures based on a system inlet air temperature.

2. The controller as recited in claim 1 wherein said processor is further configured to determine said selected target discharge air temperature based on a selected input coupled to said processor.

3. The controller as recited in claim 1 wherein said processor is further configured to activate a second heat pump stage when receiving said heat pump thermostat call.

4. The controller as recited in claim 3 wherein said processor is further configured to delay activation of said blower for a predetermined amount of time when receiving said heat pump thermostat call.

5. The controller as recited in claim 1 further comprising current sensing circuitry coupled to said processor and configured to automatically detect a number of said electrical heating elements installed in said heating system.

6. The controller as recited in claim 1 wherein said system interface includes terminals to receive thermostat calls associated with said heat pump and said electrical heating elements selected from the group consisting of:
    a first stage heat pump demand,
    a second stage heat pump demand,
    a first stage electrical heat demand, and
    a second stage electrical heat demand.

7. The controller as recited in claim 1 wherein said processor is further configured to select said starting heat load based on a number of said electrical heating elements installed in said heating system.

8. A method of operating a heating system having a heat pump, electrical heating elements and a thermostat, comprising:
    monitoring said thermostat for thermostat calls associated with said heat pump and said electrical heating elements;
    determining a discharge air target temperature of said heating system; and
    selecting a starting heat load, by selectively energizing at least one of said heat pump, electrical heating elements and blower, based on said thermostat calls and said discharge air target temperature;
    wherein said discharge air target temperature is selected from a predefined list of discharge air target temperatures based on a system inlet air temperature.

9. The method as recited in claim 8 wherein said selecting is further based on a number of said electrical heating elements installed in said heating system.

10. The method as recited in claim 8 wherein said heating system further includes a blower, said method further comprising delaying activation of said blower for a predetermined amount of time when receiving a heat pump thermostat call.

11. The method as recited in claim 10 further comprising activating a second stage of said heat pump when receiving said heat pump thermostat call.

12. The method as recited in claim 8 further comprising employing current sensing circuitry to automatically detect a number of said electrical heating elements connected to said heating system.

13. The method as recited in claim 8 wherein said discharge air target temperature is determined based on a predetermined setting.

14. The method as recited in claim 8 wherein said thermostat calls associated with said heat pump and said electrical heating elements are selected from the group consisting of:
    a first stage heat pump demand,
    a second stage heat pump demand,
    a first stage electrical heat demand, and
    a second stage electrical heat demand.

15. A heating system for an enclosure, comprising:
    a heat pump;
    electrical heating elements;
    a blower;
    a thermostat; and
    a controller coupled to said heat pump, said electrical heating elements, said blower and said thermostat, said controller comprising:
        a system interface configured to receive thermostat calls from said thermostat, said thermostat calls including a heat pump thermostat call and an electrical heating elements thermostat call; and
        a processor coupled to said system interface and configured to select a starting heat load for said heating system, by selectively energizing at least one of said heat pump, electrical heating elements and blower, based on said thermostat calls and a selected target discharge air temperature for said heating system;
        wherein said target discharge air temperature is selected from a predefined list of target discharge air temperatures based on a system inlet air temperature.

16. The heating system as recited in claim 15 wherein said processor is further configured to determine said selected target discharge air temperature based on a selected input coupled to said processor.

17. The heating system as recited in claim 15 wherein said processor is further configured to activate a second stage of said heat pump when receiving said heat pump thermostat call.

18. The heating system as recited in claim 17 wherein said processor is further configured to delay activation of said blower for a predetermined amount of time when receiving said heat pump thermostat call.

19. The heating system as recited in claim 15 wherein said controller further comprises current sensing circuitry coupled to said processor and configured to automatically detect a number of said electrical heating elements installed in said heating system.

20. The heating system as recited in claim 15 wherein said processor is further configured to select said starting heat load based on a number of said electrical heating elements installed in said heating system.

* * * * *